United States Patent
Gaubert

(10) Patent No.: US 11,703,413 B2
(45) Date of Patent: Jul. 18, 2023

(54) METHOD FOR DETERMINING THE FREE VOLUME OF AN ANNULAR SPACE OF A FLEXIBLE PIPE AND ASSOCIATED SYSTEM

(71) Applicant: TECHNIP FRANCE, Courbevoie (FR)

(72) Inventor: Isabelle Gaubert, Rives-en-Seine (FR)

(73) Assignee: TECHNIP FRANCE

( * ) Notice: Subject to any disclaimer, the term of this patent is extended or adjusted under 35 U.S.C. 154(b) by 230 days.

(21) Appl. No.: 17/275,222

(22) PCT Filed: Sep. 12, 2019

(86) PCT No.: PCT/EP2019/074295
§ 371 (c)(1),
(2) Date: Mar. 11, 2021

(87) PCT Pub. No.: WO2020/053318
PCT Pub. Date: Mar. 19, 2020

(65) Prior Publication Data
US 2022/0050006 A1    Feb. 17, 2022

(30) Foreign Application Priority Data
Sep. 12, 2018 (FR) ...................................... 1858166

(51) Int. Cl.
*G01M 3/28* (2006.01)

(52) U.S. Cl.
CPC .......... *G01M 3/2815* (2013.01); *G01M 3/283* (2013.01)

(58) Field of Classification Search
CPC ........ G01M 3/00; G01M 3/28; G01M 3/2815; G01M 3/283
See application file for complete search history.

(56) References Cited

U.S. PATENT DOCUMENTS

| 7,891,384 B2 * | 2/2011 | Binet ..................... F16L 11/083 |
| | | 138/104 |
| 10,948,131 B1 * | 3/2021 | Francis ..................... F17D 5/02 |
| 2017/0023435 A1 * | 1/2017 | Mangai ............... G01M 3/2815 |

(Continued)

FOREIGN PATENT DOCUMENTS

| EP | 3123067 B1 * | 11/2020 | ............ F16L 11/083 |
| WO | WO 2014/000760 A1 | 1/2014 | |

OTHER PUBLICATIONS

International Search Report dated Dec. 4, 2019 in corresponding PCT International Application No. PCT/EP2019/074295.

(Continued)

*Primary Examiner* — Nguyen Q. Ha
(74) *Attorney, Agent, or Firm* — Ostrolenk Faber LLP

(57) ABSTRACT

A method that consists of the following steps: depressuring and isolating the annular space; recording a first pressure and temperature prevailing in the annular space; injecting a given amount of a measuring gas into the annular space and isolating the annular space, the annular space remaining under negative pressure after the injection and isolation; measuring the given amount of measuring gas; recording a second pressure in the annular space after the isolation of the annular space; and determining the free volume of the annular space on the basis of the first pressure, the second pressure, the temperature, and the measurement of the given amount of measuring gas.

13 Claims, 2 Drawing Sheets

(56) References Cited

U.S. PATENT DOCUMENTS

2017/0145808 A1    5/2017    Amundsen et al.
2019/0011324 A1*    1/2019    Nelson .................. E21B 47/003

OTHER PUBLICATIONS

Written Opinion dated Dec. 4, 2019 in corresponding PCT International Application No. PCT/EP2019/074295.
Search Report dated May 22, 2019 in corresponding French Patent Application No. 18 58166.
J. Smith Franck, "UKOOA Guidance Note on Monitoring Methods and Integrity Assurance for Unbonded Flexible Pipe," Oct. 8, 2002, 64 pages, retrieved from the Internet: https://www.ukooa.co.uk/issues/fpso/docsguidancenoterev05.pdf (retrieved on May 22, 2019).
Dominique Dion et al., "Flexible Pipe Integrity Monitoring: A New System to Assess the Flexible Pipe Annulus Condition," Proceedings of Offshore Technology Conference, Jan. 1, 2010, Society of Petroleum Engineers, 8 pages.

* cited by examiner

METHOD FOR DETERMINING THE FREE VOLUME OF AN ANNULAR SPACE OF A FLEXIBLE PIPE AND ASSOCIATED SYSTEM

CROSS-REFERENCE TO RELATED APPLICATIONS

The present application is a 35 U.S.C. §§ 371 national phase conversion of PCT/EP2019/074295, filed Sep. 12, 2019, which claims priority to French Patent Application No. 18 58166, filed Sep. 12, 2018, the contents of which are incorporated herein by reference. The PCT International Application was published in the French language.

TECHNICAL FIELD

The present invention relates to a method for determining the free volume of an annular space of a flexible pipe, the flexible pipe defining a central internal passage for circulation of a fluid, the annular space containing at least one layer of tensile armor, the method comprising at least one measurement cycle comprising:
  vacuuming the annular space and isolating the annular space;
  measuring a first pressure in the annular space and the temperature in the annular space, after isolating the annular space.

BACKGROUND OF THE INVENTION

The flexible pipe is as described, in particular, in the normative documents published by the American Petroleum Institute (API), API 17J "Specification for Unbonded Flexible Pipe" 4$^{th}$ Edition May 2014, and API RP 17B "Recommended Practice for Flexible Pipe" 5$^{th}$ Edition May 2014. The flexible pipe is a riser and/or a flowline laid on the seabed.

The pipe is intended for transporting hydrocarbons in deep water, for example, and is therefore likely to be used at high pressures, above 100 bars or even up to 1000 bars, and at high temperatures, above 130° C. or even 170° C., for long periods of time, that is, several years, typically 30 years.

The flexible pipes consist of an assembly of flexible sections or a single flexible section. They generally comprise an outer protective jacket defining an inner volume and at least one impermeable inner jacket arranged inside the inner volume.

This inner jacket is typically a pressure jacket delineating a fluid flow passage.

The fluid is a hydrocarbon, in particular, containing corrosive gases such as carbon dioxide and hydrogen sulfide.

The inner and outer jackets delimit an annular space between them. Layers of tensile armor formed by layers of generally metallic wires are arranged in the annular space to ensure good tensile strength of the flexible pipe.

In some cases, the annular space containing the layers of tensile armor is subjected to hydrocarbons and acid gases such as hydrogen ($H_2$), hydrogen sulfide ($H_2S$) and carbon dioxide ($CO_2$) from the fluids being transported, which have a relatively high partial pressure.

In the presence of water coming either from the water contained in the transported hydrocarbon that has permeated through the inner jacket and then condensed in the annular space, or from the water body in the event of a tear in the outer jacket, the layers of tensile armor are subject to corrosion which, depending on the severity of the environment in the annular space, can lead to a loss of integrity of the mechanical properties of the flexible pipe and ultimately to its ruin.

In addition, the combination of the corrosive environment related to mechanical loading can lead to the formation of numerous corrosion mechanisms, including stress corrosion cracking (SCC).

In order to alleviate this problem, and to maintain the mechanical resistance of the armor layers, it is necessary to reduce and/or stop the phenomena of corrosion.

A possible solution consists in extracting the acid gases from the annular ring by pumping them out. For this purpose, a vacuum pump can be connected to the ring gauge. The vacuum pump is activated to prevent condensation of the water vapor diffused through the ring gauge, to evaporate the liquid water already present in the ring gauge, and to reduce the partial acid gas pressure.

WO2014/000760 describes a method of the above-mentioned type. This method is carried out by means of a vacuum pump directly connected to the outlet of the annular space, the backflow of which is sent to a blowhole.

Another important parameter for monitoring the integrity of the armor layers is the determination of the free volume of the annular space. Indeed, the annular space is a very confined area in which a free volume is present in the interstices defined between the armor wires of an armor layer, or between two distinct armor layers, such as the pressure vault and an armor layer.

As mentioned above, the annular space is likely to be at least partially filled with water. In this case, the free volume decreases.

Therefore, it is worth measuring the free volume present in the annular space at regular intervals to determine if water is present in the annular space, and take appropriate corrective action.

To measure the free volume, WO2014/000760 provides for having the pressure in the annular space increase by diffusion of gases from the fluid flow passage, then evacuating the annular space, measuring the amount of material pumped out of the annular space, and relating it to the pressure difference observed during pumping, using the law of perfect gases, to deduce from this the free volume of the annular space.

Such a method is not entirely satisfactory. Indeed, it must be implemented when a significant amount of gas has escaped into the annular space through the internal jacket. For relatively impermeable inner jackets, it is therefore long and sometimes tedious to obtain a sufficient amount of gas to perform a free volume test that gives significant results.

Furthermore, the small amount of gas pumped makes the measurement imprecise, which can lead to significant errors in the estimation of the free volume.

In addition, the accumulation of corrosive gases in the annular space before pumping can lead to corrosion.

SUMMARY OF THE INVENTION

One object of the invention is therefore to obtain a monitoring method that ensures an improved service life for a flexible pipe, in order to limit the corrosion of metal armor in particular.

To this end, the object of the invention is a flexible pipe annular space free volume determining method, the flexible pipe defining a central internal passage for circulation of a fluid, the annular space containing at least one layer of tensile armor, the method comprising at least one measurement cycle comprising:
- vacuuming the annular space and isolating the annular space;
- measuring a first pressure in the annular space and the temperature in the annular space after the isolation of the annular space;
- injecting into the annular space a given amount of a measuring gas not coming from the internal central passage and isolating the annular space, the annular space remaining under vacuum after the injection and the isolation;
- measuring the given amount of measuring gas injected into the annular space;
- measuring a second pressure in the annular space after the annular space has been isolated;
- determining the free volume of the annular space on the basis of the first pressure, the second pressure, the temperature and the measurement of the given amount of measuring gas.

The method according to the invention may comprise one or more of the following features, taken alone or in any technically possible combination:
- it comprises, after the step of injecting the measuring gas and isolating the annular space, a step of stabilizing the pressure in the annular space, the second pressure being measured after the stabilization step;
- the pressure in the annular space measured by the pressure sensor after the injection step reaches a maximum below atmospheric pressure, the pressure in the annular space measured by the pressure sensor decreasing during the stabilization step;
- the steps of measuring the first pressure and the second pressure are carried out by a pressure sensor located outside the annular space and connected to the annular space or by a pressure sensor located in the annular space;
- the supply of a measuring gas outside of the flexible pipe, the injection of measuring gas comprising the flow of measuring gas from the outside of the flexible pipe to the annular space;
- a flow meter is interposed between the outside of the flexible pipe and the annular space, the measurement of the given amount of measuring gas being carried out on the basis of at least one measurement provided by the flow meter;
- the vacuuming of the annular space is carried out by a vacuum pump connected to the annular space in parallel with the supply of measuring gas;
- the measuring gas is a neutral gas, such as nitrogen.
- it comprises a step, after measuring the second pressure in the annular space, of pumping the gas present in the annular space in order to vacuum the annular space again;
- it comprises at least one additional measuring cycle after renewed vacuuming, comprising the following steps:
- measuring a new first pressure in the annular space and the temperature in the annular space, after the annular space has been isolated;
- injecting a new given amount of a measuring gas not coming from the internal central passage into the annular space and isolating the annular space, the annular space remaining under vacuum after isolation;
- measuring the new given amount of measuring gas injected into the annular space;
- measuring a new second pressure in the annular space after the isolation of the annular space;
- determining a new free volume of the annular space on the basis of the new first pressure, the new second pressure, the temperature, and the new given amount of measuring gas;
- it comprises maintaining a pressure, between each measurement cycle, of less than 1 bara, preferably between 5 mbara and 1000 mbara at the lowest point of the annular space;
- the measuring gas is supplied from a measuring gas reservoir or from a gas supply network provided on a surface assembly.

The invention also relates to a system for regulating and controlling a flexible pipe capable of measuring the free volume of an annular space of the flexible pipe, the flexible pipe defining a central internal passage for circulation of a fluid, the annular space containing at least one layer of tensile armor, the system comprising:
- an apparatus for vacuuming the annular space;
- an isolation valve for isolating the annular space interposed between the vacuuming apparatus and the annular space;
- a pressure sensor for measuring a pressure in the annular space and a temperature sensor for measuring a temperature in the annular space located in the annular space and/or located outside the annular space while being connected to the annular space;

characterized by:
- an assembly for injecting measuring gas into the annular space;
- a control unit adapted to control the vacuuming apparatus for generating a vacuuming of the annular space, to control the isolation valve for isolating the annular space after the vacuum has been generated, to read a first pressure in the annular space by means of the pressure sensor, and to read a temperature in the annular space by means of the temperature sensor after the annular space has been isolated;
- the control unit being adapted to control the injection assembly to inject into the annular space a given amount of a measuring gas not coming from the internal central passage and to control the isolation valve to isolate the annular space, and to maintain the annular space under vacuum after isolation;
- the control unit being adapted to read the given amount of measuring gas injected into the annular space, and to detect a second pressure in the annular space by means of the pressure sensor after the annular space has been isolated; and
- the system comprising a calculation unit adapted to determine the free volume of the annular space, on the basis of the first pressure, the second pressure, the temperature, and the given amount of measuring gas.

BRIEF DESCRIPTION OF THE DRAWINGS

The invention will be better understood upon reading the following description, given only as an example, and made with reference to the appended drawings, in which.

DESCRIPTION OF PREFERRED EMBODIMENTS

Figure 1:
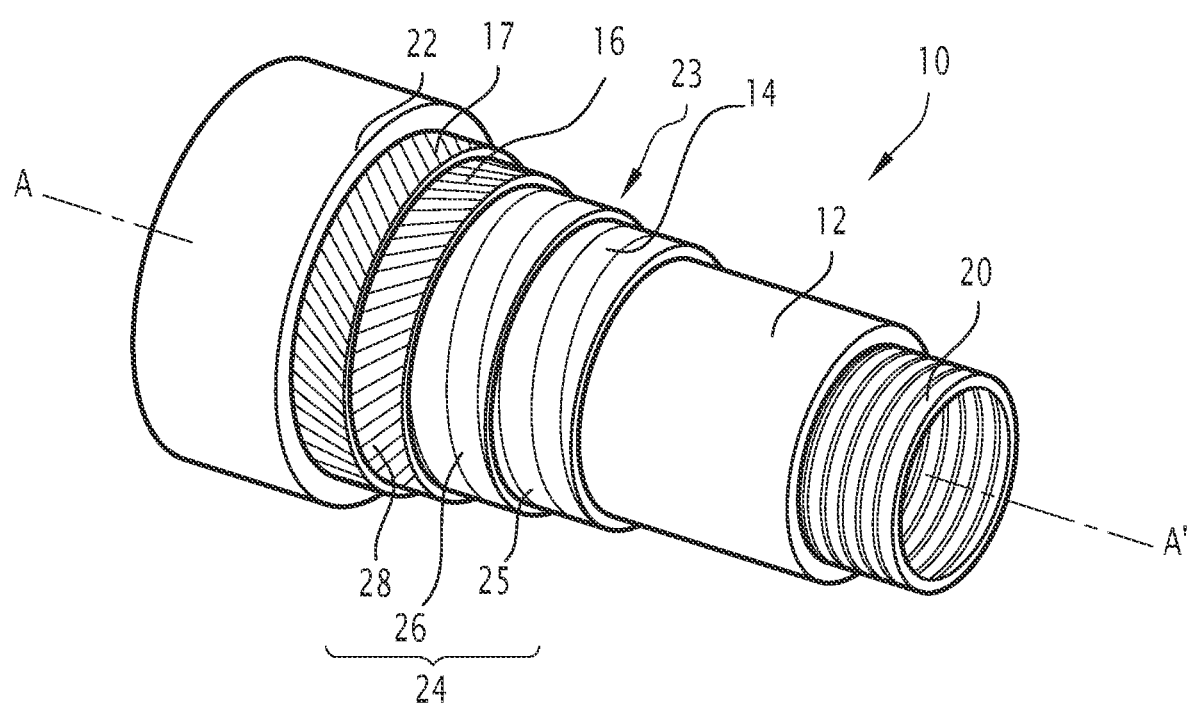
FIG. 1 is an exploded perspective view of a first flexible pipe intended to be monitored by the monitoring method according to the invention.
Figure 2:
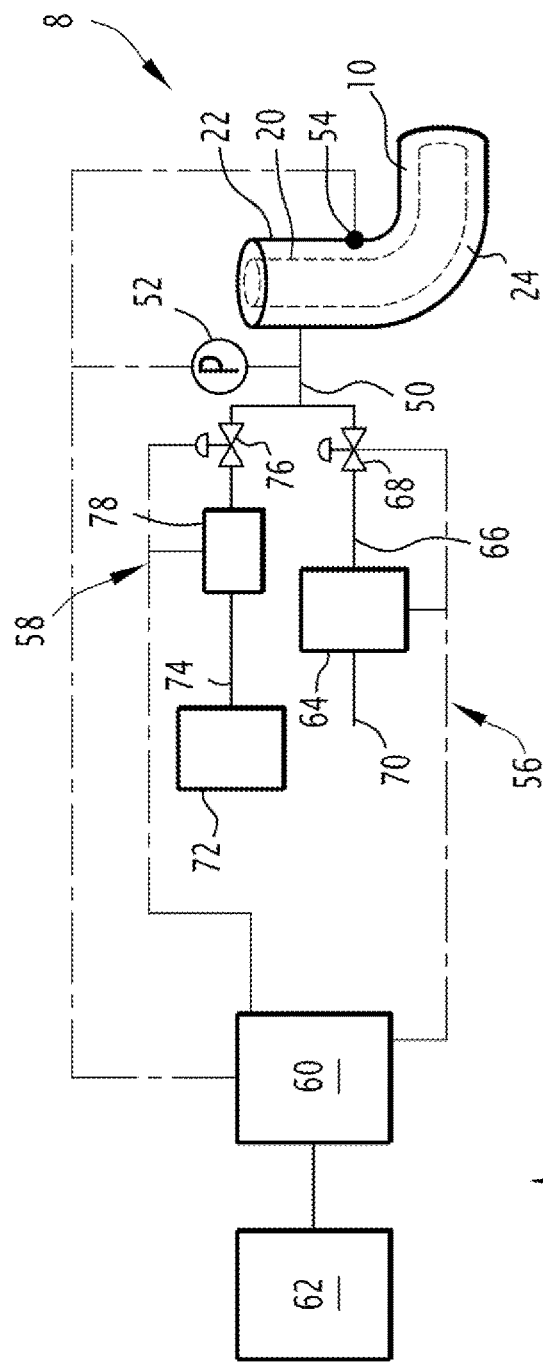
FIG. 2 is a schematic view showing the main components of a regulation and control system for the implementation of the method according to the invention.

FIG. 2 schematically illustrates a first system 8 for regulating and controlling a flexible pipe 10, an example of which is illustrated partially in FIG. 1.

The flexible pipe 10 is intended to be laid through a body of water (not illustrated) in a facility for the exploitation of fluids, in particular hydrocarbons.

The body of water is a sea, a lake or an ocean for example. The depth of the body of water in front of the flexible pipe 10 is between 50 m and 4000 m, for example.

The fluid exploitation facility consists of a surface assembly, usually floating, and a bottom assembly which are usually connected by the flexible pipe 10. The flexible pipe 10 can also be used to connect bottom assemblies to each other, or surface assemblies to each other.

The flexible pipe 10 has a central section, illustrated in part in FIG. 1, and at each axial end of the central section, an end cap not illustrated.

The flexible pipe 10 in this example is an "unbonded" pipe.

At least two adjacent layers of this flexible pipe 10 are free to move longitudinally relative to each other when bending the pipe 10.

Advantageously, all adjacent layers of this flexible pipe 10 are free to move relative to each other. Such a pipe is described for example in the normative documents published by the American Petroleum Institute (API), API 17J (May 2014, 4th edition) and API RP17B (May 2014, 5$^{th}$ Edition).

The flexible pipe 10 extends along an A-A' axis.

Throughout the following, the terms "outside" and "inside" are generally understood to be radial to the A-A' axis of the flexible pipe 10, with the term "outside" being understood to be relatively farther radially from the A-A' axis and the term "inside" being understood to be relatively closer radially to the A-A' axis of the flexible pipe 10.

As illustrated in FIG. 1, the flexible pipe 10 defines a plurality of concentric layers around the A-A' axis, which extend continuously along the flexible pipe 10 to the ends of the flexible pipe 10.

In particular, the flexible pipe 10 comprises a tubular inner jacket 12, at least one layer of tensile armor 16, 17 and an outer jacket 22. Advantageously, the flexible pipe 10 additionally comprises a pressure vault 14, and/or an inner casing 20.

In a known manner, the inner jacket 12 is intended to tightly confine the medium transported in the flexible pipe 10. The inner jacket 12 is preferably made of a polymer material, e.g., based on a polyolefin such as polyethylene or polypropylene, based on a polyamide such as PA11 or PA12, or based on a fluorinated polymer such as polyvinylidene fluoride (PVDF).

Alternatively, the inner jacket 12 is formed based on a high performance polymer such as polyaryletherketone (PAEK) such as polyetheretherketone (PEK), polyetheretherketone (PEEK), polyetheretherketoneketoneketone (PEEKK), polyetherketoneketoneketone (PEKK) or polyetheretherketoneketoneketone (PEKEKK), polyamideimide (PAI), polyetherimide (PEI), polysulfone (PSU), polyphenylsulfone (PPSU), polyethersulfone (PES), polyarylsulfone (PAS), polyphenylene ether (PPE), polyphenylene sulfide (PPS), liquid crystal polymers (LCP), polyphthalamide (PPA), fluorinated derivatives such as polytetrafluoroethylene (PTFE), perfluoropolyether (PFPE), perfluoroalkoxy (PFA) or ethylene chlorotrifloroethylene (ECTFE) and/or mixtures thereof.

The thickness of the inner jacket 12 is, for example, between 5 mm and 20 mm.

The inner jacket 12 internally defines a central fluid flow passage with axis A-A'.

The casing 20 consists of a profiled metal strip, wound in a spiral. The coils of the strip are advantageously stapled to each other, which allows to take up the radial crushing forces. In this example, the casing 20 is arranged inside the inner jacket 12 in the central passage. Due to the geometry of the casing 20, the flexible pipe 10 is referred to as "rough bore".

In a variant (not illustrated), the flexible pipe 10 has no inner casing and is therefore referred to as "smooth bore".

The outer jacket 22 is located outside the inner casing 12. The outer jacket 22 defines an inner volume in which the casing 20, inner jacket 12, pressure vault 14 and the or each layer of tensile armor 16, 17 are located.

Together with the inner jacket 12, the outer jacket 22 defines an annular space 24.

The annular space 24 is defined in the inner volume. The annular space 24 is liable to be flooded by a liquid, in particular by water from the body of water or water contained in the transported fluid which has diffused and then condensed through the inner jacket 12 into the annular space 24.

The outer jacket 22 typically has the shape of a cylinder revolving around axis A-A'. The outer jacket 22 generally has a diameter between 50 mm (2 inches) and 500 mm (20 inches), preferably between 120 mm (5 inches) and 330 mm (13 inches), and a thickness between 0.5 mm and 20 mm, preferably between 4 mm and 15 mm.

The pressure vault 14 is located in the annular space 24, outside the inner jacket 12. The pressure vault 14 is configured to take up the radial forces related to the pressure inside the inner jacket 12.

The pressure vault 14 is advantageously formed by a metal profile wire 25 helically wound around the inner jacket 12. The profile wire 25 preferably has a Z-shaped geometry. The Z-geometry improves the overall mechanical strength and reduces the mass of the flexible pipe 10.

Alternatively, the profile wire 25 has a T-, U-, K-, X- or I-shaped geometry.

The pressure vault 14 is helically wound with a short pitch around the inner jacket 12. The helix angle has an absolute value close to 90° with respect to the A-A' axis of the flexible pipe 10, typically between 75° and 90°.

The flexible pipe 10 is optionally fitted with a shrink disc 26.

The shrink disc 26, when present, consists of a spiral winding of at least one wire of preferably rectangular cross section around the pressure vault 14. The superposition of several wires wound around the pressure vault 14 can advantageously replace a given total thickness of the shrink disc 26. This increases the resistance to rupture of the flexible pipe 10. The winding of at least one wire is short pitch around the A-A' axis of the flexible pipe 10, that is, with an absolute helix angle close to 90°, is typically between 75° and 90°.

In an alternative embodiment of the invention, the pressure vault 14 and the shrink disc 26 are replaced by a pressure vault 14 of greater thickness formed from a profiled metal wire 25 having a T-, U-, K-, X- or I-shaped geometry, and/or from at least one strip of high-strength aramid (Technora® or Kevlar®), and/or from at least one composite strip comprising a thermoplastic matrix in which carbon fibers or glass fibers are embedded.

Each tensile armor layer 16, 17 is located in the annular space 24, outside the pressure vault 14.

In the example illustrated in FIG. 1, the flexible pipe 10 has at least one pair of tensile armor layers 16, 17.

Each pair consists of a first layer of tensile armor 16 applied to the pressure vault 14, the inner jacket 12, or another pair of tensile armor layers 16, 17, and a second layer of tensile armor 17, arranged around the first tensile armor layer 16.

Each tensile armor layer 16, 17 has at least one longitudinal armor element 28 helically wound in a long pitch around the A-A' axis of the flexible pipe 10. The helix value is less than or equal to 60°, and is typically between 10° and 60°.

The armor elements 28 of a first layer of tensile armor 16 are generally wound at an opposite angle to the armor elements 28 of a second layer of tensile armor 17. Thus, if the winding angle of the armor elements 28 of the first tensile armor layer 16 is equal to +a, with a being between 10° and 60°, the winding angle of the armor elements 28 of the second tensile armor layer 17 arranged in contact with the first tensile armor layer 16 is, for example, −α, with α being between 10° and 60°.

The armor elements 28 are made of metal or composite wires or high-strength tapes, for example.

In this example, each tensile armor layer 16, 17 is supported by at least one wear-resistant strip (not illustrated). The wear strip is made of plastic, e.g., based on polyamide, polyvinylidene fluoride (PVDF), polytetrafluoroethylene (PTFE), polyetheretherketone (PEEK) or polyphenylsulfone (PPSU). It has a thickness less than the thickness of each jacket.

Advantageously, a retaining tape such as a high-strength aramid tape (Technora® or Kevlar®) is wound around the second layer of tensile armor 17 outermost from the A-A' axis, to provide mechanical support for the layers of tensile armor 16, 17. Alternatively, aramid fibers are replaced by glass or carbon fibers.

The system 8 for the regulation and control of the flexible pipe 10 is illustrated in FIG. 2. With reference to this figure, system 8 consists of an access pipe 50 in annular space 24, a pressure sensor 52 for measuring pressure in annular space 24, here mounted on the access pipe 50, and a temperature sensor 54 for measuring temperature in the annular space 24.

The system 8 also comprises a vacuuming assembly 56 for vacuuming annular space 24, and an assembly 58 for injecting a measuring gas into the annular space 24.

Vacuuming means the action of lowering the pressure of a given medium by creating a partial vacuum through the use of a device such as a pump.

In addition, the system 8 has a control unit 60 capable of taking measurements from the pressure sensor 52 and temperature sensor 54, and of controlling the vacuuming unit 56 and the measuring gas injection assembly 58. In addition, the system 8 has a calculation unit 62 for calculating a free volume of the annular space 24 on the basis of the measurements taken by the control unit 60.

The access pipe 50 to the annular space 24 is located above ground. It opens into the annular space 24 through an end piece (not illustrated) of the flexible pipe 10.

Here the pressure sensor 52 is connected to the access line 50. It is suitable for measuring an absolute pressure of the annular space 24 on the surface.

Alternatively, the pressure sensor 52 is placed in the annular space 24 of the flexible pipe 10.

The temperature sensor 54 is arranged in the annular space 24 to measure the temperature of the annular space 24.

The temperature sensor 54 comprises at least one optical fiber arranged in the annular space 24. The at least one optical fiber is connected at one end to the control unit 60 such as a signal detection and evaluation device in order to display and thus measure the temperature in annular space 24 in real time.

Alternatively, the temperature sensor 54 includes calculation and simulation software for obtaining an estimate of the temperature in the annular space 24.

Thus, the prevailing pressure in the annular space 24 and the temperature in the annular space 24 are measured by means of the sensors 52, 54, which can be arranged in the annular space 24 or outside the annular space 24 and connected to the annular space 24.

The vacuuming assembly 56 comprises a vacuum pump 64, a pipe 66 for connection to the annular space 24, a first shut-off valve 68, and a vent 70.

The vacuum pump 64 has an inlet connected to the connecting line 66, and an outlet connected to the vent 70. It is capable of vacuuming by pumping fluid between the inlet to the outlet. It is connected to and controlled by the control unit 60.

In this example, the connecting line 66 opens into the access line 50 and is connected to the annular space 24 via the access line 50. Alternatively, the connecting line 66 opens directly into the annular space 24, without passing through the access line 50.

The first shut-off valve 68 is installed in the connecting line 66 between the vacuum pump 64 and annular space 24. It is controlled by the control unit 60.

The measuring gas injection assembly 58 consists of a measuring gas reservoir 72, an injection line 74, a second shut-off valve 76 and a flow meter 78 for the injected measuring gas.

The measuring gas container 72 is a cylinder, for example, or a reservoir containing the measuring gas. Preferably, the measuring gas is an inert gas, such as nitrogen.

The measuring gas does not originate from the internal central passage of the flexible pipe 10 and has a composition different from it.

The injection line 74 is connected to the reservoir 72. In this example, it opens into the access line 50, parallel to the connecting line 66, and is connected to the annular space 24 via the access line 50. Alternatively, the injection line 74 opens directly into annular space 24 without passing through the access line 50.

The second shut-off valve 76 is mounted on the injection line 74 between the nitrogen reservoir 72 and the annular space 24. It is controlled by the control unit 60.

The flow meter 78 is installed between the reservoir 72 and the second shut-off valve 76. It is capable of generating a measurement of the amount of measuring gas that has passed through the flow meter 78, in particular by means of a flow index, commonly referred to as a totalizer or meter.

It is connected to the control unit 60 to enable the measurement, in particular the flow index, to be read by the control unit 60.

As will be seen below, the control unit 60 can be activated to carry out vacuuming cycles for the annular space 24 and, between vacuuming cycles, cycles for measuring the free volume of annular space 24.

For each vacuuming cycle, the control unit 60 is adapted to open the first shut-off valve 68, activating the vacuum pump 64 and detecting the pressure measured by the pressure sensor 52 to determine a stationary vacuum state of annular space 24.

For each measuring cycle, the control unit 60 closes the first shut-off valve 68, deactivates the vacuum pump 64 and opens the second shut-off valve 76 to allow a certain amount of measuring gas to be injected into annular space 24.

The control unit 60 is also capable of reading the measurement of the pressure sensor 52, for each measuring cycle, to keep the pressure in the annular space 24 below atmospheric pressure when the injection of the determined amount of measuring gas is carried out.

The control unit 60 is also capable of recording the pressure P1 and the flow index N1 before the injection for each measurement cycle and then the pressure P2 and the flow index N2 after the injection, when the pressure measurement is stable. The control unit 60 is also capable of measuring the temperature T in the annular space 24 after injection.

The calculation unit 62 is capable of acquiring the measurements of pressure P1, P2, flow index N1, N2 before and after injection, and the temperature T in the annular space 24 and to calculate the free volume V by the law of perfect gases:

$$V=(N2-N1)\times R\times T/(P2-P1) \quad (1),$$

wherein R is the perfect gas constant.

In a variant, the test gas is supplied by a gas supply network initially provided at the surface assembly level. The injection line 74 via the access line 50 connects the network of the surface assembly directly to the annular space 24 of the flexible pipe 10.

The flow meter 78, the control unit 60 and the calculation unit 62 operate in the same way as before, for the use of a reservoir 72.

A method for operating the regulation and control system 8 according to the invention, for carrying out a method for determining the free volume of an annular space 24 of a flexible pipe 10, shall now be described.

When the flexible pipe 10 is in operation, a succession of vacuuming cycles are carried out. As described above, the control unit 60 opens the first shut-off valve 68, keeps the second shut-off valve 76 closed, and activates the vacuum pump 64.

As illustrated by reference 100 in FIG. 3, the pressure in the annular space 24 then gradually decreases.

The control unit 60 reads the pressure measured by the pressure sensor 52 and checks whether a stationary vacuum state of the annular space 24 has been reached.

When the stationary state is reached, the control unit 60 switches off the vacuum pump 64 and closes the first shut-off valve 68. The annular space 24 is then isolated. The absolute pressure in the annular space 24, taken at the surface, is then advantageously less than 1 bara, preferably between 5 mbara and 800 mbara. The absolute pressure in the annular space depends on the type of structure of the controlled flexible pipe 10.

"Isolated" or "isolation" means the action of separating one medium from another in order to prevent any transfer of material and/or fluid, by means of separation means such as, for example, a valve, a flap, a plug, a wall.

As illustrated by reference 102 in FIG. 3, the pressure in the annular space 24 then increases progressively under the effect of the diffusion of gases through the inner jacket 20 to the annular space 24.

More precisely, the pressure measured in the annular space 24 increases progressively but in a non-linear way, typically according to an exponential curve. As soon as the curve is observed to become substantially linear, the annular space 24 is considered to be substantially stabilized, although gas diffusion continues homogeneously.

When a measurement cycle has to be started, the control unit 60 reads a first pressure P1 in the annular space 24, as measured by the pressure sensor 52, and reads a first flow index measurement N1 from the flow meter 78. The control unit 60 also reads the temperature value T in the annular space 24.

Then, as illustrated by reference 104 in FIG. 3, the control unit 60 opens the second shut-off valve 76 to allow a certain amount of measuring gas to be injected through the injection line 74 to the annular space 24.

When injecting the measuring gas, the control unit 60 measures the pressure increase in the annular space 24 and controls this pressure increase so that it remains below atmospheric pressure, in particular below 1 bara, preferably between 50 mbara and 800 mbara.

More precisely, the pressure increase in the annular space is linked both to the injection of the measuring gas and to the natural diffusion of the gases contained in the fluid flowing through the internal central passage.

When injection is complete, the control unit 60 closes the second shut-off valve 76 to isolate the annular space 24.

The pressure measured in the annular space 24 after the injection step reaches a maximum below atmospheric pressure.

The control unit 60 then keeps the annular space 24 isolated for a period of time corresponding to a pressure stabilization, as illustrated in reference 106.

The pressure measured in the annular space 24 decreases during the stabilization step due to the homogenization of the measuring gas along the pipe 10.

Specifically, the pressure measured in annular space 24 decreases from the maximum below atmospheric pressure to a low point. Over a period of time Δt, the test gas that has been injected into the annular space 24 of the pipe 10 from the upper surface area must progress along the armor wires 28 of the tensile armor layers 16, 17 to its lower part in the water body.

The time period Δt varies depending on the length and diameter of the pipe 10. Typically, Δt is between several tens of minutes and a few hours.

During this period of time Δt, in combination with the homogenization phenomenon of the measuring gas along the pipe 10, the gases contained in the fluid circulating in the internal central passage continue to diffuse through the internal jacket 12 to the annular space 24.

When the pressure measured by the sensor 52 stabilizes or reaches a minimum, the control unit 60 reads a second pressure value P2 in the annular space 24 from the pressure sensor 52 and a second flow index N2 from the flow meter 78.

When this is done, the calculation unit 62 retrieves the first pressure value P1, the second pressure value P2, the first flow index N1, the second flow index N2 and the measured temperature value T and calculates the free volume V of the annular space 24 by the above equation (1).

Figure 3:
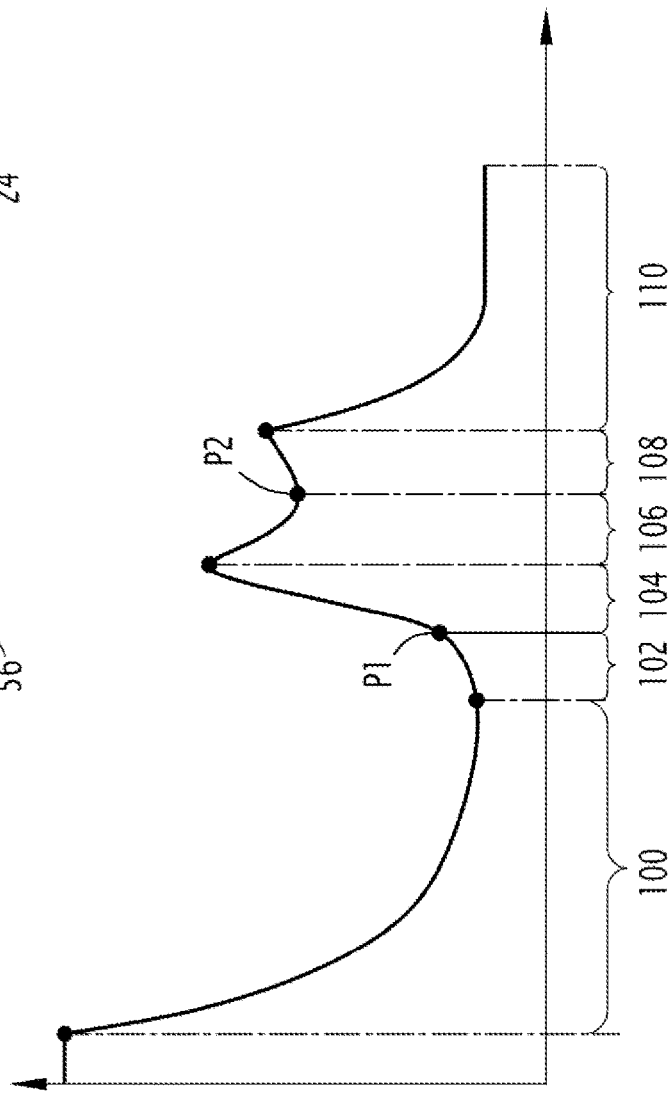
FIG. 3 is a graph showing the pressure measured in the annular space as a function of time, taken successively when the annular space is vacuumed and then during a test cycle.

As indicated by reference 108 in FIG. 3, the pressure in the annular space 24 increases again under the effect of the gases diffused from the inner jacket 20.

The control unit 60 then starts a new vacuuming cycle, as described above, as illustrated by reference 110 in FIG. 3.

This vacuuming cycle can be followed by at least one further measurement cycle, as described above.

Thanks to the invention just described, it is possible to combine vacuuming cycles with measuring cycles to evaluate the free volume of the annular space 24 very precisely. The evaluation of the free volume is carried out with a significant amount of measuring gas, which makes it possible to obtain precise results at times chosen by the operator, without having to wait for a significant amount of gas to diffuse into the annular space 24, and by eliminating the risk of corrosion due to the diffused gas.

The regulation and control system 8 can be easily and automatically installed by permanently connecting it to the annular space 24 of the flexible pipe 10, preferably at the upper end.

The control and regulation system 8 is thus placed in a surface facility with an opening in the flexible pipe 10 or on a portable support and is able to evaporate the liquid water from the annular space 24 when the annular space 24 has been flooded.

In this way, it is possible to monitor the presence of water in the annular space 24 in order to prevent or at least reduce corrosion and to intervene as quickly as possible when water is detected. The service life of the components contained in the annular space 24, such as the armor layers 16, 17, or vault 14 is increased.

The regulation and control system 8 also enables the service life of the flexible pipe 10 to be estimated precisely, taking corrosion phenomena into account.

In one variant, additional sensors are arranged in the annular space 24 and/or on the access pipe 50 to monitor the contents of the annular space 24. These sensors are for example sensors for measuring hydrogen, carbon dioxide, hydrogen sulfide, methane and/or extracted water volume.

In a variant, cycles for circulating neutral gases, in particular nitrogen, in the annular space 24 are implemented after a vacuuming cycle.

In an alternative embodiment of the invention, the method for determining the free volume includes an additional step.

After the step of vacuuming and isolating the annular space 24, a reference pressure Pr is measured. The reference pressure Pr corresponds to the minimum of the curve illustrated in FIG. 3, at the end of the phase referenced 100.

The gases contained in the fluid circulating in the internal central passage are then allowed to diffuse naturally through the internal jacket 12 into the annular space 24, for a defined period of time Δt.

Δt varies according to the length and diameter of the pipe 10.

Δt is between a few tens of minutes and a few hours, for example between 15 minutes and 4 hours, preferably between 30 minutes and 2 hours.

As soon as the pressure measured in the annular space 24 by the sensor 52 describes an exponential curve and the latter describes a substantially linear slope, at the end of the time period Δt the medium is considered to be stabilized and the gas diffusion continues homogeneously.

A first pressure P1 in the annular space 24 and the temperature T in the annular space 24 are measured.

When a measuring cycle has to be started, the control unit 60 detects a first pressure P1 in the annular space 24, as measured by pressure sensor 52, and detects a first flow index measurement N1 from flow meter 78. The control unit 60 also reads the temperature value T in the annular space 24.

A determined amount of test gas is then injected through the injection line 74 into the annular space 24.

When injecting the measuring gas, the control unit 60 measures the pressure increase in the annular space 24 and controls this pressure increase so that it remains below atmospheric pressure, in particular below 1 bara, preferably between 50 mbara and 800 mbara.

When injection is complete, the control unit 60 closes the second shut-off valve 76 to isolate the annular space 24.

The pressure measured in the annular space 24 after the injection step reaches a maximum below atmospheric pressure.

The control unit 60 then keeps the annular space 24 isolated for a period of time corresponding to pressure stabilization.

The pressure measured in the annular space 24 decreases during the stabilization step due to the homogenization of the measuring gas along the pipe 10.

When the pressure measured by the sensor 52 stabilizes or reaches a minimum, the control unit 60 reads a second pressure value P2 in the annular space 24 from the pressure sensor 52 and a second flow index N2 from the flow meter 78.

When this is done, the calculation unit 62 retrieves the value of the reference pressure Pr, the first pressure value P1, the second pressure value P2, the first flow index N1, the second flow index N2 and the measured temperature value T and calculates the free volume V of the annular space 24 from the above equation (1). This leads to:

$$V=(N2-N1)\times R\times T/(P2-(P1-Pr)),$$

where R is the constant of the perfect gases.

By subtracting, in the calculation of free volume, the pressure component (P1−Pr) linked to the diffusion of the gases contained in the fluid circulating in the internal central passage and having diffused through the internal jacket 12 to the annular space 24, only the pressure component (P2) linked to the injection of neutral gas (nitrogen) remains.

Thus, the determination of the free volume of the annular space 24 is improved. For subsequent cycles, the pressure measurement readings and thus the determination of the free volume increases in accuracy.

Indeed, knowing the pressure increase due to the natural diffusion of the gases that have diffused from the internal central passage to the annular space over the period of time Δt, it is possible for the following measurements to subtract this pressure differential when taking the pressure reading P2, after injection of the measuring gas, for the same time interval Δt. From then on, only the pressure differential related to the injection of the measuring gas is measured.

The determination of the free volume of the annular space 24 of the pipe 10 is thus calculated precisely. This is especially true since the natural diffusion of the gases contained in the medium flowing through the internal central passage is important.

Although this alternative embodiment of the invention relates to a method of determining the free volume of an annular space of a flexible pipe in which all the pressures measured are lower than atmospheric pressure, it is quite conceivable to transpose it to one or more methods of determining the free volume of an annular space of a flexible pipe in which all the pressures measured are higher than atmospheric pressure.

This additional step is carried out before and after the implementation steps of at least one free volume measurement cycle.

After the steps of carrying out at least one free volume measurement cycle, the step of maintaining the isolation of the annular space 24 may possibly be followed by a step of vacuuming the annular space 24 so that the pressure inside the annulus does not reach the limit pressure at which the SCC phenomenon starts.

The invention claimed is:

1. A flexible pipe annular space free volume determining method, the flexible pipe defining a central internal passage for circulation of a fluid, the annular space containing at least one layer of tensile armor,
the method comprising at least one measurement cycle comprising:
vacuuming the annular space and isolating the annular space so as to generate and provide the annular space with a pressure below atmospheric pressure;
measuring a first pressure in the annular space and the temperature in the annular space after the isolation of the annular space;
injecting into the annular space a given amount of a measuring gas not coming from the internal central passage and isolating the annular space, the annular space remaining under a pressure below atmospheric pressure after the injection and the isolation;
measuring the given amount of measuring gas injected into the annular space;
measuring a second pressure in the annular space after the isolation of the annular space;
determining the free volume of the annular space on the basis of the first pressure, the second pressure, the temperature and the measurement of the given amount of measuring gas.

2. The method according to claim 1, comprising, after injecting the measuring gas and isolating the annular space, stabilizing the pressure in the annular space, the second pressure being measured after stabilizing the pressure.

3. The method according to claim 1, wherein measuring the first pressure and the second pressure is carried out by a pressure sensor located outside the annular space and connected to the annular space or by a pressure sensor located in the annular space.

4. The method according to claim 1, comprising supplying a measuring gas outside of the flexible pipe, the injection of measuring gas comprising flowing measuring gas from the outside of the flexible pipe to the annular space.

5. The method according to claim 4, wherein a flow meter is interposed between the outside of the flexible pipe and the annular space, the measurement of the given amount of measuring gas being carried out on the basis of at least one measurement provided by the flow meter.

6. The method according to claim 4, wherein the vacuuming of the annular space is carried out by a vacuum pump connected to the annular space in parallel with a supply of measuring gas.

7. The method according to claim 1, wherein the measuring gas is a neutral gas.

8. The method according to claim 1, comprising, after measuring the second pressure in the annular space, pumping out the gas present in the annular space in order to vacuum the annular space again.

9. The method according to claim 8, comprising at least one additional measuring cycle after another vacuuming, the at least one additional measuring cycle comprising:
measuring a new first pressure in the annular space and a new temperature in the annular space, after the annular space has been isolated;
injecting a new given amount of a measuring gas not coming from the internal central passage into the annular space and isolating the annular space, the annular space remaining under a pressure below atmospheric pressure after isolation;
measuring the new given amount of measuring gas injected into the annular space;
measuring a new second pressure in the annular space after the isolation of the annular space;
determining a new free volume of the annular space on the basis of the new first pressure, the new second pressure, the new temperature and the new given amount of measuring gas.

10. The method according to claim 9, comprising maintaining a pressure, between each measurement cycle, of less than 1 bara, to be the lowest pressure point in the annular space.

11. The method according to claim 1, comprising, after vacuuming and isolating the annular space, and before the first pressure is measured, a measuring of a reference pressure, followed by a time delay to allow gas diffusion to occur from the central passage to the annular space, the determination of the free volume of the annular space being carried out by further using the measured reference pressure.

12. The method according to claim 10, comprising maintaining a pressure, between each measurement cycle, between 5 mbara and 800 mbara, to be the lowest pressure point in the annular space.

13. A flexible pipe regulating and controlling system configured to measure the free volume of an annular space of the flexible pipe, the flexible pipe defining a central internal passage for circulation of a fluid, the annular space containing at least one layer of tensile armor, the system comprising:
a vacuum pump configured to vacuum the annular space;
an isolation valve configured to isolate the annular space, interposed between the vacuum pump apparatus and the annular space so as to generate and provide the annular space with a pressure below atmospheric pressure;
a pressure sensor configured to measure a pressure in the annular space and a temperature sensor configured to measure a temperature in the annular space, located in the annular space or/and located outside the annular space while being connected to the annular space;
the system comprising:
an injector configured to inject measuring gas into the annular space;
a controller configured to control the vacuum pump to generate a vacuuming of the annular space, to control the isolation valve to isolate the annular space after the vacuum has been generated, to read a first pressure in the annular space measured by the pressure sensor and to read a temperature in the annular space measured by the temperature sensor after the annular space has been isolated;
the control unit being configured to control the injector to inject into the annular space a given amount of a measuring gas not coming from the internal central passage and to control the isolation valve to isolate the annular space, and to maintain the annular space under a pressure below atmospheric pressure after isolation;
the control unit being configured to read the given amount of measuring gas injected into the annular space, to read a second pressure in the annular space measured by the pressure sensor after the annular space has been isolated;
the system comprising a calculator configured to determine the free volume of the annular space on the basis of the first pressure, the second pressure, the temperature and the given amount of measuring gas.

\* \* \* \* \*